(12) United States Patent
Sato

(10) Patent No.: US 6,965,476 B2
(45) Date of Patent: Nov. 15, 2005

(54) DIFFRACTIVE OPTICAL ELEMENT

(75) Inventor: Hideki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/871,630

(22) Filed: Jun. 4, 2001

(65) Prior Publication Data

US 2002/0030889 A1 Mar. 14, 2002

(30) Foreign Application Priority Data

Jun. 7, 2000 (JP) .......................... 2000/170942
Jun. 1, 2001 (JP) .......................... 2001/166243

(51) Int. Cl.⁷ ..................... G02B 5/18; G02B 27/44; B29D 11/00
(52) U.S. Cl. ............... 359/569; 359/566; 359/565; 359/576; 216/24; 264/2.5
(58) Field of Search ............... 359/565, 566, 359/569, 571, 576; 216/24; 264/2.5

(56) References Cited

U.S. PATENT DOCUMENTS

| 3,678,147 A | 7/1972 | Patchen |
| 4,426,131 A | 1/1984 | Gowan |
| 4,966,447 A | 10/1990 | Huang Alan et al. |

(Continued)

FOREIGN PATENT DOCUMENTS

| EP | 1 001 301 | 5/2000 |
| JP | 58-157317 | 9/1983 |
| JP | 63-172204 | 7/1988 |
| JP | 02-078901 | 3/1990 |
| JP | 02-143201 | 6/1990 |
| JP | 63-158245 | 6/1990 |
| JP | 03-250437 | 11/1991 |
| JP | 04-213421 | 8/1992 |
| JP | 06-324262 | 11/1994 |
| JP | 09-127322 | 5/1997 |
| JP | 10-123388 | 5/1998 |
| JP | 10-133149 | 5/1998 |
| JP | 10-274705 | 10/1998 |
| JP | 11-044810 | 2/1999 |
| JP | 11-111606 | 4/1999 |
| JP | 11-223717 | 8/1999 |
| JP | 2000-75118 | 3/2000 |
| JP | 2000-114143 | 4/2000 |
| WO | 99/38046 | 7/1999 |

OTHER PUBLICATIONS

Londoño, et al., "The Design of Achromatized Hybrid Diffractive Lens Systems," SPIE vol. 1354, International Lens Design Conference, pp. 30–37, (1990).

Kathman, et al., "Binary Optics in Lens Design," SPIE vol. 1354, International Lens Design Conference, pp. 297–309 (1990).

(Continued)

*Primary Examiner*—Audrey Chang
(74) *Attorney, Agent, or Firm*—Fitzpatrick, Cella, Harper & Scinto

(57) ABSTRACT

A diffractive optical element includes a first diffractive optical part having a phase type diffractive grating, and a second diffractive optical part having a phase type diffractive grating formed of a material differing from that of the first diffractive optical part. The first diffractive optical part and the second diffractive optical part are disposed in proximity to each other with an air layer. Each of the first diffractive optical part and the second diffractive optical part has a mark for aligning them with the optical effective areas thereof.

6 Claims, 6 Drawing Sheets

U.S. PATENT DOCUMENTS

| | | | |
|---|---|---|---|
| 5,044,706 A | 9/1991 | Chen | 359/357 |
| 5,101,389 A | 3/1992 | Ohuchida et al. | |
| 5,117,306 A | 5/1992 | Cohen | |
| 5,149,181 A | 9/1992 | Bedford | |
| 5,152,788 A | 10/1992 | Isaacson et al. | |
| 5,208,700 A | 5/1993 | Harris et al. | |
| 5,214,535 A * | 5/1993 | Harris et al. | 359/565 |
| 5,229,797 A | 7/1993 | Futhey et al. | |
| 5,496,616 A * | 3/1996 | Harris | 359/569 |
| 5,629,804 A | 5/1997 | Tomono | |
| 5,771,218 A | 6/1998 | Feldman et al. | |
| 5,790,321 A | 8/1998 | Goto | 359/742 |
| 5,811,790 A | 9/1998 | Endo et al. | |
| 5,838,703 A | 11/1998 | Lebby et al. | |
| 5,847,877 A * | 12/1998 | Imamura et al. | 359/666 |
| 5,867,266 A | 2/1999 | Craighead | |
| 5,902,997 A | 5/1999 | Kropp | |
| 5,973,844 A | 10/1999 | Burger | |
| 6,064,057 A | 5/2000 | Shimomura et al. | 250/226 |
| 6,156,243 A * | 12/2000 | Kosuga et al. | 264/2.5 |
| 6,587,272 B2 | 7/2003 | Nakai | 359/569 |

OTHER PUBLICATIONS

Wood, "Using Hybrid Refractive–Diffractive Elements in Infrared Petzval Objectives," SPIE vol. 1354, International Lens Design Conference, pp. 316–322 (1990).

International Lens Design Conference, Proceedings, International Society for Optical Engineering, vol. 1354, pp. 24–37, Jun. 11–14, 1990.

Patent Abstracts of Japan vol. 2000, No. 7, Sep. 29, 2000.

Patent Abstracts of Japan vol. 0143, No. 81 (P–1093), Aug. 16, 1990.

Patent Abstracts of Japan vol. 1999, No. 13, Nov. 30, 1999.

\* cited by examiner

DIFFRACTIVE OPTICAL ELEMENT

BACKGROUND OF THE INVENTION

1. Field of the Invention

This invention relates to a diffractive optical element and a method of manufacturing the same, and particularly to a diffractive optical element for use in light of a plurality of wavelengths or bands and a method of manufacturing the same.

2. Related Background Art

In a refracting optical system, use has heretofore been made of a method of decreasing chromatic aberration by combining glass materials differing in dispersion. In contrast, a method of decreasing chromatic aberration by providing a diffractive optical element having the diffracting action on a lens surface or in a portion of an optical system is disclosed in such literature as SPIE, Vol. 1354, International Lens Design Conference (1990), Japanese Patent Application Laid-Open No. 4-213421 (corresponding U.S. Pat. No. 5,0447,06), Japanese Patent Application Laid-Open No. 6-324262 (corresponding U.S. Pat. No. 5,790,321), etc. These correct chromatic aberration by the utilization of the phenomenon that chromatic aberration appears in opposite directions on a refractive part and a diffractive part disposed in an optical system. Also, such a diffractive optical element is comprised of phase-type diffractive gratings having synchronism, and can also be given an effect like that of an aspherical lens by varying the period of the periodic structure thereof, and is greatly effective to reduce aberrations.

The diffractive optical element having the above-described phase-type diffractive gratings, unlike a conventional lens optically acting by the refractive index of the medium thereof and the profile of the surface thereof, performs action similar to that of a lens which causes incident light to converge or diverge by a diffractive phenomenon occurring due to the synchronism of the diffractive gratings. The shape of the diffractive gratings in such a diffractive optical element has is a concentric circular shape centering around a point, and the diffractive grating nearest to the central point is called a first zone, and the subsequent diffractive gratings are called a second zone, a third zone, and so on.

Also, such a diffractive optical element can be made by injection molding using a resin molding metal mold, etching, laser beam machining or the like. Generally the injection method is adopted because it is advantageous during mass production. For the working of the metal mold used in this injection method, cutting using a diamond turning tool, i.e., the so-called diamond turning, is widely used.

The aligning when the diffractive optical element made by this method is mounted on a lens holder is presented in Japanese Patent Application Laid-Open No. 10-274705. The diffractive optical element has its grating structure determined so that a beam in the entire area of the wavelength used may concentrate in a particular order (hereinafter referred to also as the design order), and in addition, is designed such that the diffractive efficiency thereof becomes high at a certain wavelength of the design order (hereinafter referred to also as the design wavelength).

The diffractive efficiency at the particular diffractive order when a diffractive optical element as shown in FIG. 9 of the accompanying drawings is formed on a certain surface is shown in FIG. 10 of the accompanying drawings.

When use is made of a diffractive optical element in which the diffractive grating is constituted by only one layer like this, diffractive efficiency becomes highest at the design wavelength, and gradually becomes lower at the other wavelengths. These amounts of reduction in diffractive efficiency by the diffractive grating of a single layer become diffracted lights of the other orders, and become a cause of the flare on the image plane. Also, particularly when a plurality of diffractive optical elements are used, the reduction in diffractive efficiency at the other wavelengths than the design wavelength leads to a reduction in transmittance.

A construction which can decrease this reduction in diffractive efficiency is proposed in Japanese Patent Application Laid-Open No. 11-223717. According to this, high diffractive efficiency is maintained in the entire area of the wavelength used by a diffractive optical element of structure in which diffractive gratings of at least two layers are laminated. Flare or the like is also effectively restrained thereby.

When a diffractive optical element of such a laminated type is to be manufactured, the alignment of the diffractive gratings of respective layers becomes an important matter. It is because unless the diffractive gratings of the respective layers are accurately aligned, diffractive efficiency is reduced all the more in spite of being special laminated structure which can realize high diffractive efficiency over a wide wavelength band.

Regarding a method of aligning two diffractive gratings, for example, Japanese Patent Application Laid-Open No. 2000-114143 discloses a construction in which a concave portion and a convex portion are provided near the centers of the optical effective portions of the two diffractive gratings and they are fitted together to thereby effect positioning.

However, when the technique disclosed in the above-mentioned publication is adopted for a diffractive optical element in which two diffractive gratings are disposed with an air layer therebetween, the positioning convex portion becomes longer by an amount corresponding to the air layer and therefore, there is the following problem. If the convex portion is made thin so as not to affect optical performance, uncertainty of strength will occur, and if the convex portion is made thick so as not to pose a problem in strength, influence upon optical performance will be feared.

SUMMARY OF THE INVENTION

The present invention, taking the above-described prior art into account, has as its object to provide a diffractive optical element which enables alignment to be effected highly accurately when a diffractive optical element of the laminated type in which a plurality of diffractive gratings are disposed with an air layer therebetween is manufactured. According to the diffractive optical element of the present invention, the occurrence of flare attributable to the alignment error between the plurality of diffractive gratings can be restrained and as the result, high diffractive efficiency can be achieved in a wide wavelength band.

In order to achieve the above object, the diffractive optical element of the present invention comprises a first diffractive part having phase-type diffractive gratings disposed in proximity to each other with an air layer therebetween, and a second diffractive optical part having phase-type diffractive gratings formed of a material differing from that of the first diffractive optical part, and is characterized by marks for aligning the first and second diffractive optical parts with each other formed in the optical effective areas of the first diffractive optical part and the second diffractive optical part.

Also, a method of manufacturing the diffractive optical element of the present invention is characterized by the step of molding a first diffractive optical part having a phase-type diffractive grating, the step of molding a second diffractive optical part having a phase-type diffractive grating, the step of aligning the first diffractive optical part and the second diffractive optical part with each other while observing marks present on the optical effective areas of the first diffractive optical part and the second diffractive optical part, and the step of fixing the first diffractive optical part and the second diffractive optical part with an air layer therebetween.

Also, a metal mold for manufacturing the diffractive optical element of the present-invention is characterized by a first area for molding a phase-type diffractive grating, and a second area provided in the first area for molding a mark for aligning the diffractive grating molded thereby with another member.

DESCRIPTION OF THE PREFERRED EMBODIMENTS

An embodiment of the present invention will hereinafter be described.

Figure 1:
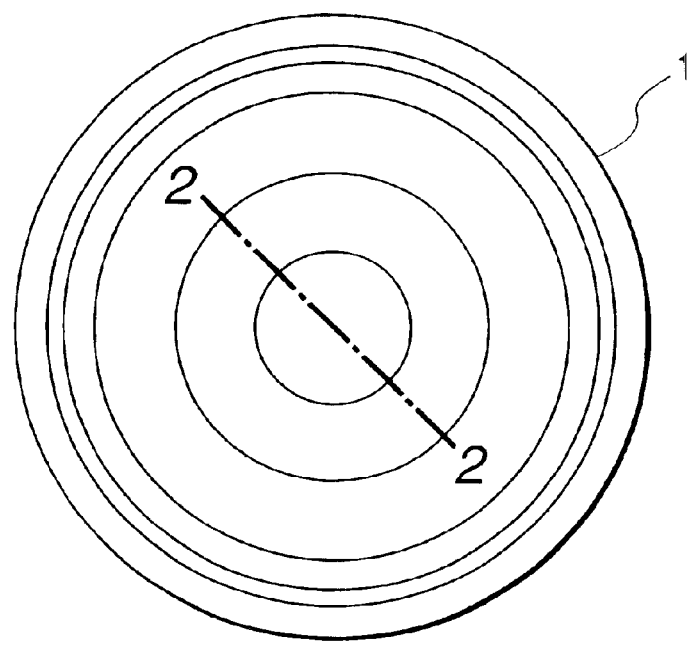
FIG. 1 is a front view of a laminated-type diffractive optical element according to an embodiment of the present invention.
Figure 2:
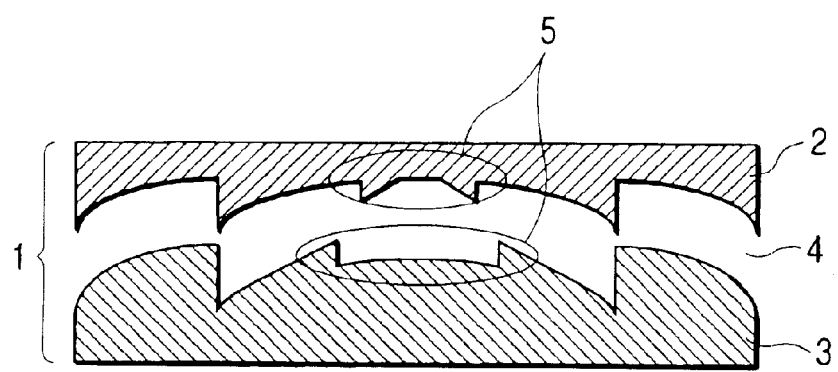
FIG. 2 is an enlarged cross-sectional view of the essential portions of the central portion of the laminated-type diffractive optical element according to the embodiment.

FIG. 1 is a front view of a diffractive optical element 1 according to the present embodiment. FIG. 2 shows a cross-sectional shape of the diffractive optical element of FIG. 1 taken along the line 2—2 of FIG. 1, and in order to help understanding, the diffractive optical element is depicted more exaggeratedly in the direction of depth of a diffractive grating than actual circumstances. In FIG. 2, the reference numeral 2 designates concentric circular phase-type diffractive gratings constituting a diffractive optical part of a first layer, and the reference numeral 3 denotes concentric circular phase-type diffractive gratings constituting a diffractive optical part of a second layer. Registration marks 5 are provided near the optical axis which is the optical effective areas of the diffractive optical parts 2 and 3 of these first and second layers. The registration marks 5 are used to effect alignment highly accurately when the diffractive optical element 1 of laminated structure is made.

The diffractive optical element 1 according to the present embodiment is of a structure having the diffractive optical part 2 of the first layer, the diffractive optical part 3 of the second layer and an air layer 4 spacing the diffractive optical parts of the first layer and the second layer apart by a predetermined distance from each other. Also, the diffractive optical part 2 of the first layer and the diffractive optical part 3 of the second layer are formed of materials differing in dispersion, and act as a diffractive optical element through all the layers including the air layer 4.

The zonal diffractive gratings the diffractive optical parts of the respective layers of the diffractive optical element 1 have will now be described.

A phase function $\phi(r)$ representative of the zonal diffractive grating is generally expressed as follows.

$$\phi(r) = \frac{2\pi}{\lambda_0} \cdot F(r) \tag{1}$$

$$F(r) = \Sigma(C_1 \cdot r^{2i}) = C_1 \cdot r^2 + C_2 \cdot r^4 + C_3 \cdot r^6 + C_4 \cdot r^8 + C_5 \cdot r^{10} + \ldots, \tag{2}$$

where r is the distance from the center (the center of zone).

Structure giving $2\pi$ as a phase difference is a period, and if the pitch is defined as P, from $$\frac{2\pi}{\lambda} \cdot \frac{\partial F(r)}{\partial r} \cdot P = 2\pi, \tag{3}$$

$$P = \frac{\lambda}{\frac{\partial F(r)}{\partial r}}. \tag{4}$$

In the present embodiment, the registration mark 5 is provided on the diffractive optical part of each layer. In FIG. 2, the sizes of the registration marks 5 are depicted exaggeratedly, but actually the registration marks are made with a size of 1% or less of the front projection area of the first diffractive grating area (first zone) as counted from the center. The diffractive efficiency of a diffractive grating can be 100% in calculation at the design wavelength, but actually the efficiency is reduced by 5 to 10% depending on the accuracy of manufacture of the grating. Accordingly, rays incident on the registration marks 5 become scattered light and cause the diffractive efficiency to be decreased, but the decrease in the diffractive efficiency thereby can be said to be within the range of an allowable error as compared with the decrease in the diffractive efficiency by the accuracy of manufacture.

As described above, the registration marks 5 for aligning the diffractive optical parts of the respective layers with each other are provided on the optical effective areas of the diffractive optical parts, whereby a diffractive optical element of laminated structure can be manufactured highly accurately, and the influence of the registration marks 5 upon optical performance can also be made small.

Figure 3A:
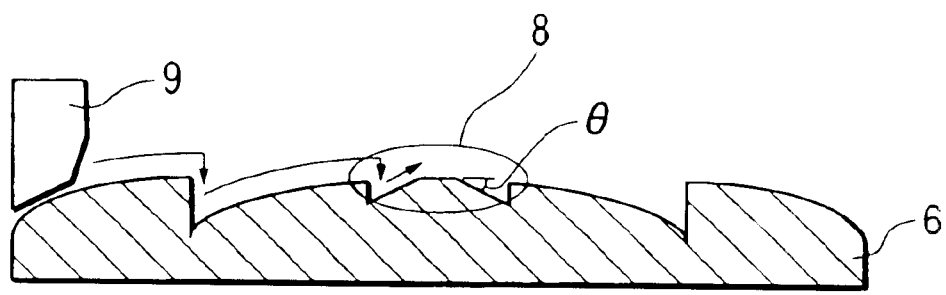
FIGS. 3A and 3B are views for illustrating a method of cutting a metal mold for molding a diffractive grating.
Figure 3B:
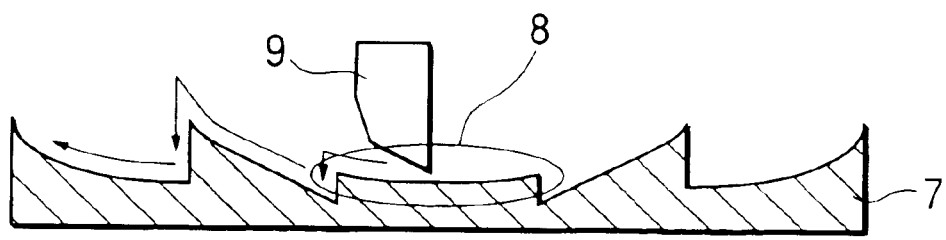

Description will now be made of a method of cutting a metal mold for making the above-described diffractive optical element 1. In the following description, the left to right direction in the plane of the drawing sheet of FIGS. 3A and 3B is defined as x direction, and the vertical direction in the plane of the drawing sheet of FIGS. 3A and 3B is defined as y direction (the upper side is the + (plus) direction). FIG. 3A shows a metal mold 6 for making a diffractive grating of a concave lens type (corresponding to the diffractive optical part 2 of the first layer in FIG. 2). This metal mold 6 is rotated about a position corresponding to the optical axis, and cutting is effected by a diamond turning tool 9.

As shown in FIG. 3A, the working of the metal mold 6 for the diffractive grating of the concave lens type is done with the diamond turning tool 9 moved from the outer side in x direction (the peripheral side) toward the inner side (central side). When the first zone on the most central side is to be cut, the diamond turning tool 9 is moved in the minus direction of the y-axis to effect the working for the registration marks indicated by 8. At that time, the cut surface in y direction is accurately cut, and the cut surface in x direction has the angle of the tip of the diamond turning tool 9 intactly transferred thereto.

Here, the working depth of the mold areas for the registration marks is set so as to be 10% or less relative to the depth (height) of the diffractive grating. Specifically, the size of the mold area 8 for the registration marks is formed with a radius of 15 μm and a depth of 1 μm. At this time, the inclination θ of the mold area 8 for the registration mark shown in FIG. 3A is of the order of 4°.

Figure 4:
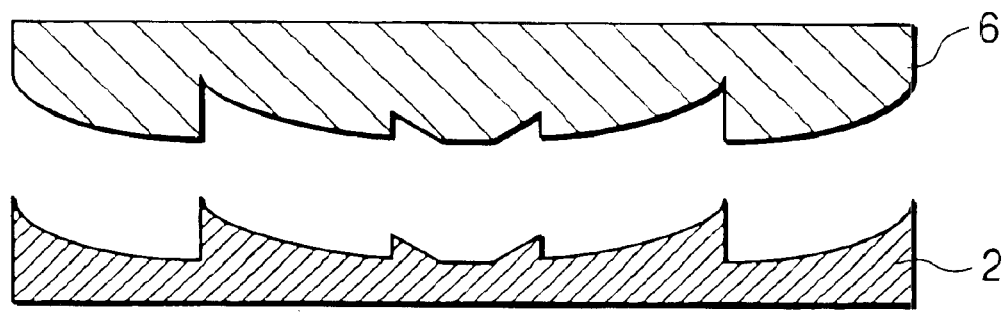
FIG. 4 shows the manner in which a diffractive grating of a concave lens-type is molded by the metal mold.

Considering that the size of the registration mark 5 is as small as about 0.1% as compared with the area of the first zone, the influence given to optical performance by the scattered light of the rays caused by the inclined surface of the registration mark 5 being inclined by 4° can be said to be very small. In this manner, the metal mold 6 is worked and further, by the use of ultraviolet setting resin, the diffractive grating of the concave lens type (the diffractive optical part 2 of the first layer) is made as shown in FIG. 4.

Figure 5:
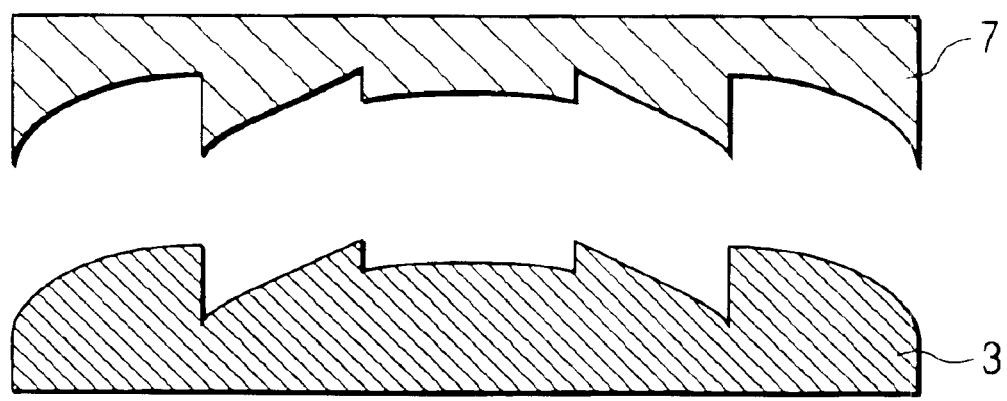
FIG. 5 shows the manner in which a diffractive grating of a convex lens type is molded by the metal mold.

FIG. 3B shows a metal mold 7 for making a diffracting grating of a convex lens type (corresponding to the diffractive optical part 3 of the second layer in FIG. 2). The making of the metal mold 7 is the same as the making of the metal mold 6 in that the metal mold is cut while being rotated about a position corresponding to the optical axis, but differs from the latter in that cutting is effected from the inner side (the central side) in x direction toward the outer side (the peripheral side) as indicated by arrows. When the first zone is to be cut, the diamond turning tool 9 is moved in the plus direction of the y-axis to work the mold area 8 for the registration mark. Again at this time, the cut surface in y direction is cut accurately and the cut surface in x direction has the angle of the tip of the diamond turning tool 9 intactly transferred thereto. The working depth of the mold area for the registration mark, as in the case of the metal mold 6, is also set so as to be 10% or less relative to the depth of the diffractive grating. By the use of the metal mold 7 worked in this manner, as shown in FIG. 5, the diffractive grating of the convex lens type (the diffractive optical part 3 of the second layer) is made by ultraviolet setting resin differing from that for the diffractive optical part 2 of the first layer.

Figure 6:
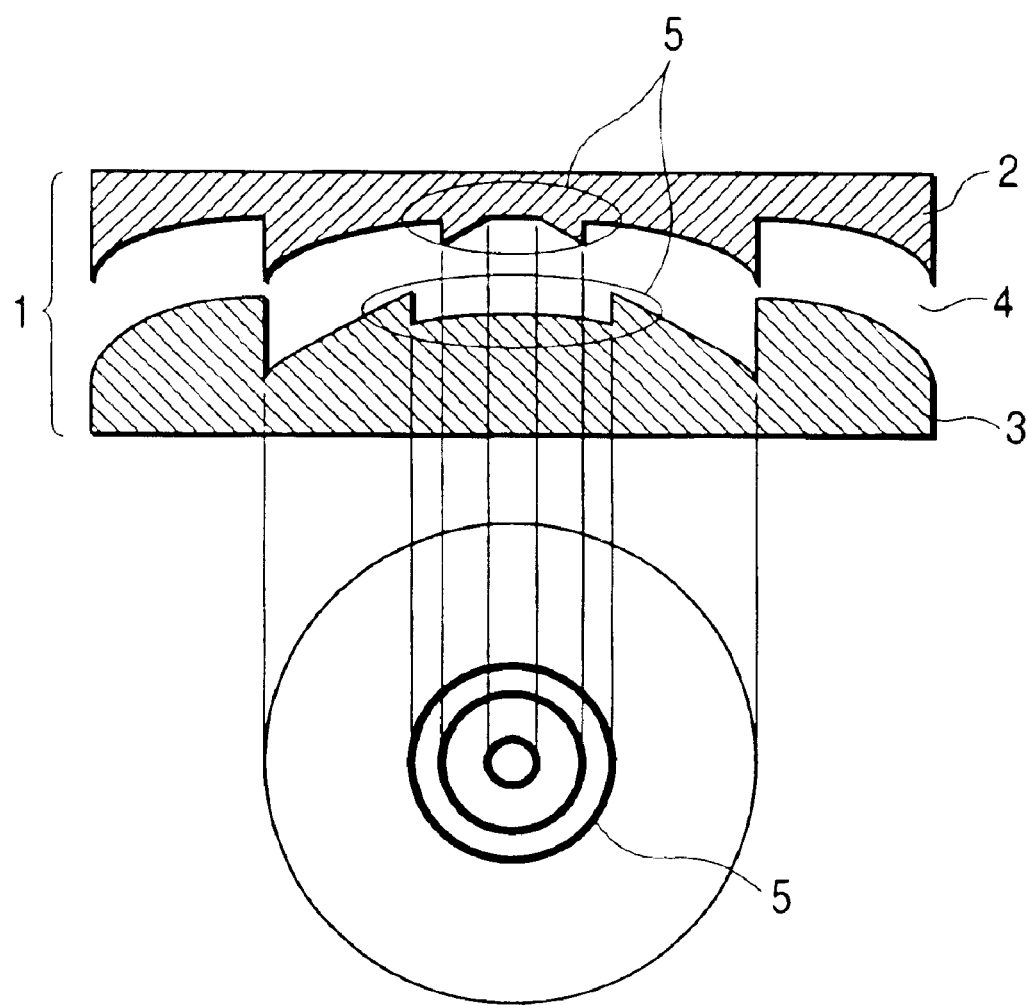
FIG. 6 is an illustration of the alignment of two diffractive optical parts using registration marks.

The diffractive optical parts made in this manner are fixed with a predetermined air layer 4 therebetween while the registration marks 5 are confirmed by means of a magnifying apparatus such as a microscope. The fixing of the two diffractive optical parts can be accomplished by joint portions, not shown, provided on the outer edges of the optical effective areas of the respective diffractive optical parts being cemented together by an adhesive agent or the like. FIG. 6 shows the state when the registration marks 5 are observed by means of the magnifying apparatus such as a microscope when the two diffractive optical parts 2 and 3 are superposed one upon the other. The locations indicated by thick lines are the edge portions of the registration marks 5, and by aligning these locations with each other, a laminated-type diffractive optical element can be made with good accuracy.

As described above, by providing registration marks optically having little influence on the optical effective areas of the diffractive optical parts, there can be made a diffractive optical element of laminated structure aligned highly accurately, i.e., a diffractive optical element of higher diffractive efficiency in which the occurrence of flare is restrained.

An embodiment of an optical system using the laminated-type diffractive optical element 1 will now be described with reference to FIG. 7.

Figure 7:
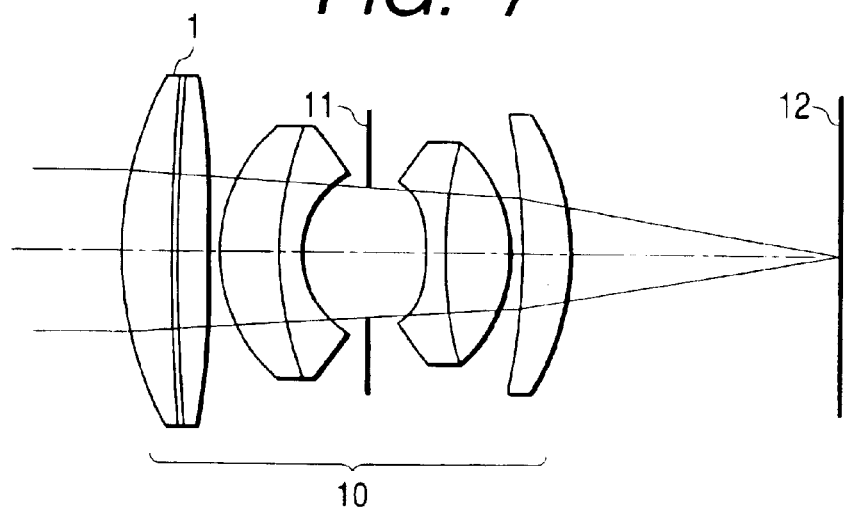
FIG. 7 schematically shows the construction of a photographing optical system.

FIG. 7 shows a cross-section of the photographing optical system of a camera or the like. In FIG. 7, the reference numeral 10 designates the photographing optical system provided with a stop 11 for determining the brightness of the optical system and the diffractive optical element 1. The reference numeral 12 denotes an imaging plane on which silver salt film or a photoelectric conversion element such as a CCD is disposed.

The diffractive optical element 1 is improved in the wavelength dependency of diffractive efficiency and creation of unnecessary diffracted light and therefore, by being used in a photographing optical system like the present embodiment, there can be obtained a photographing optical system of high performance which suffers little from flare and is high in resolving power.

While in FIG. 7, the diffractive optical element is used in the foremost lens, this is not restrictive, but the diffractive optical element may be provided in other lens than the foremost lens or a plurality of lenses. Also, while in the present embodiment, there has been shown a case where the diffractive optical element is applied to the taking lens of a camera, this is not restrictive, but the diffractive optical element may be used in an imaging optical system for use in a wide wavelength area such as the image scanner of a business machine or the reader lens of a digital copier to obtain a similar effect.

An embodiment in which the aforedescribed optical system is applied to an optical apparatus will now be described with reference to FIG. 8.

Figure 8:
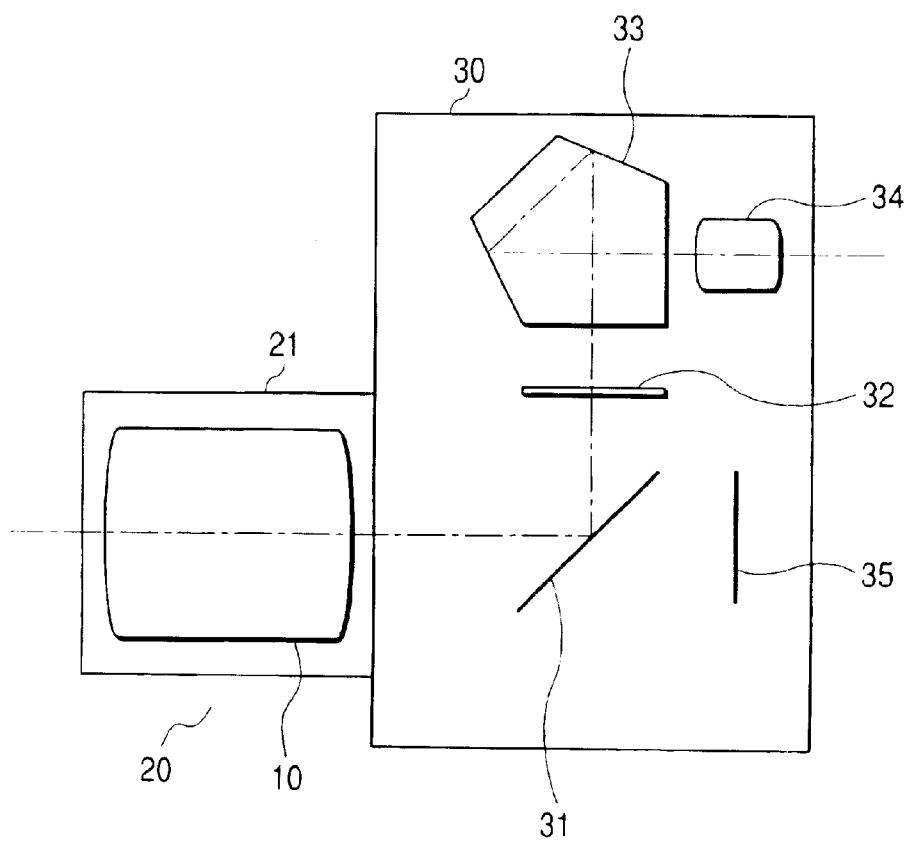
FIG. 8 schematically shows the construction of a single-lens reflex camera.
Figure 9:
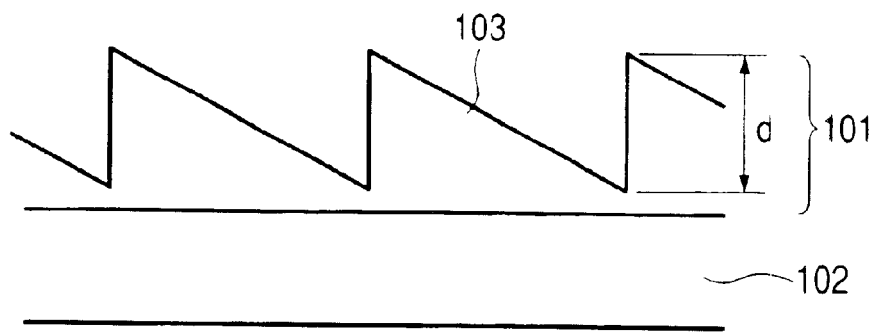
FIG. 9 shows the construction of a diffractive optical element according to the prior art.
Figure 10:
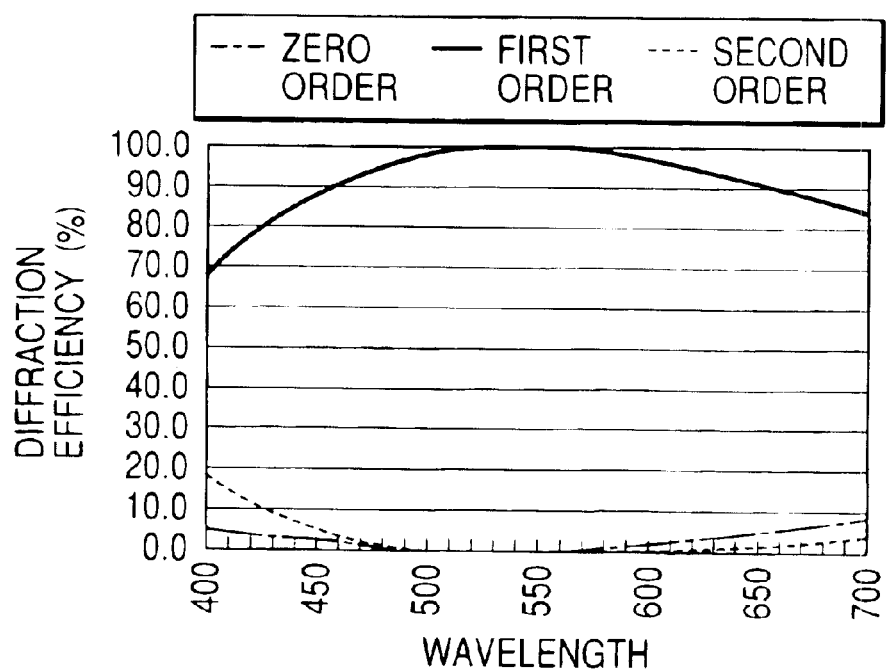
FIG. 10 is a graph showing the diffractive efficiency of the diffractive optical element shown in FIG. 9.

FIG. 8 is a schematic view of the essential portions of a single-lens reflex camera. In FIG. 8, the reference numeral 20 designates an interchangeable lens having the aforedescribed photographing optical system 10. The photographing optical system 10 is held by a lens barrel 21 which is a holding member. The reference numeral 30 denotes the main body of the camera which is comprised of a quick return mirror 31, a focus plate 32 disposed at the image forming position of the taking lens 20, a pentagonal prism 33 for converting an inverted image formed on the focus plate 32 into an erect image, an eyepiece optical system 34 for observing the erect image therethrough, etc. The reference numeral 35 designates a film surface. During photographing, the quick return mirror 31 is retracted from an optical path and a shutter curtain, not shown, is opened, and an image is formed on the film surface 35 by the taking lens 20.

The benefits obtained by the diffractive optical element of the present invention hitherto described and the optical system using the same are effectively enjoyed in the optical apparatus as disclosed in the present embodiment.

What is claimed is:

1. A diffractive optical element comprising:
    a first diffractive optical part having a phase-type diffractive grating; and
    a second diffractive optical part having a phase-type diffractive grating formed of a material differing from that of said first diffractive optical part;
    said first diffractive optical part and said second diffractive optical part being disposed in proximity to each other with a space therebetween;

each of said first diffractive optical part and said second diffractive optical part having a mark for aligning them, said mark being in the area where the diffractive grating is provided;

the depth or height of said mark is 10% or less of the depth or height of the diffractive grating of each of said first diffractive optical part and said second diffractive optical part.

2. The diffractive optical element of claim 1, wherein the diffractive grating of each of said first diffractive optical part and said second diffractive optical part is a diffractive grating formed into a concentric circular shape, and said mark has a size of 0.1% or less of a projection area of a first diffractive grating area as counted from the center.

3. The diffractive optical element of claim 2, wherein the influence of said mark upon the optical performance of said diffractive optical element is smaller than the reduction of optical performance caused by manufacturing imperfections.

4. An optical system provided with the diffractive optical element of claim 1.

5. A method of manufacturing a diffractive optical element comprising:

the step of molding a first diffractive optical part having a phase-type diffractive grating;

the step of molding a second diffractive optical part having a phase-type diffractive grating of a material differing from that of the first diffractive optical part;

the step of aligning the first diffractive optical part and the second diffractive optical part with each other while observing a mark present in the area where the diffractive grating is provided on each of the first diffractive optical part and the second diffractive optical part; and the step of fixing the first diffractive optical part and the second diffractive optical part with a space therebetween, wherein the depth or height of the mark is 10% or less of the depth or height of the diffractive grating of each of the first diffractive optical part and the second diffractive optical part.

6. A metal mold for manufacturing a diffractive optical element comprising:

a first area for molding a phase-type diffractive grating; and a second area for molding a mark for aligning said diffractive grating with another member, said second area being provided in the area for forming the diffractive grating molded by said first area, wherein the depth or height of the second area for molding the mark is 10% or less of the depth or height of the first area for molding the diffractive grating.

* * * * *

UNITED STATES PATENT AND TRADEMARK OFFICE
CERTIFICATE OF CORRECTION

PATENT NO. : 6,965,476 B2  Page 1 of 1
DATED : November 15, 2005
INVENTOR(S) : Hideki Sato It is certified that error appears in the above-identified patent and that said Letters Patent is hereby corrected as shown below:

Title page,
Item [30], Foreign Application Priority Data,
"Jun 7, 2000............2000/170942
 Jun 1, 2001............2001/166243" should read
-- Jun 7, 2000...........2000-170942
   Jun 1, 2001............2001-166243 --.

Column 1,
Line 24, "aberration" should read -- aberrations --.
Line 40, delete "has".

Column 7,
Line 5, "the" (first occurrence) should read -- wherein the --.

Signed and Sealed this

Sixth Day of June, 2006

JON W. DUDAS
*Director of the United States Patent and Trademark Office*